(12) United States Patent
Hu et al.

(10) Patent No.: US 8,804,509 B2
(45) Date of Patent: *Aug. 12, 2014

(54) SYSTEM AND METHOD OF COMMUNICATING A MEDIA STREAM

(75) Inventors: Cheng-Hong Hu, San Ramon, CA (US); Donald Smith, San Ramon, CA (US); Kuo-Hui Liu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/268,032

(22) Filed: Oct. 7, 2011

(65) Prior Publication Data

US 2012/0026871 A1    Feb. 2, 2012

Related U.S. Application Data

(63) Continuation of application No. 11/858,730, filed on Sep. 20, 2007.

(51) Int. Cl.
*H04L 12/56* (2006.01)

(52) U.S. Cl.
CPC .............. *H04L 47/30* (2013.01); *H04L 47/125* (2013.01)
USPC ............ 370/230; 370/412; 370/468; 709/233

(58) Field of Classification Search
CPC .............................. H04L 47/30; H04L 47/125
USPC .................................... 370/230, 235; 709/233
See application file for complete search history.

(56) References Cited

U.S. PATENT DOCUMENTS

| | | | |
|---|---|---|---|
| 6,169,748 B1 * | 1/2001 | Barbas et al. | 370/468 |
| 6,904,017 B1 | 6/2005 | Meempat et al. | |
| 6,952,401 B1 | 10/2005 | Kadambi et al. | |
| 7,215,637 B1 | 5/2007 | Ferguson et al. | |
| 7,321,554 B1 * | 1/2008 | Walsh et al. | 370/230 |
| 2003/0152096 A1 * | 8/2003 | Chapman | 370/412 |
| 2004/0267920 A1 | 12/2004 | Hydrie et al. | |

(Continued)

OTHER PUBLICATIONS

Robin Kravets, Ken Calvert, and Karsten Schwan, "Payoff Adaptation of Communication for Distributed Interactive Applications," The Journal for High Speed Networking: Special Issue on Multimedia Networking, 1999, 24 pages.

(Continued)

*Primary Examiner* — Mark Rinehart
*Assistant Examiner* — Matthew Hopkins
(74) *Attorney, Agent, or Firm* — Toler Law Group, PC

(57) ABSTRACT

A particular method includes measuring port usage data related to each of a plurality of physical ports associated with a link aggregation group. A bandwidth requirement of a requested media stream is estimated and added to a traffic load at each of the plurality of physical ports to produce an estimated total traffic load of each of the plurality of physical ports. When the requested media stream includes non-video data, the requested media stream is sent to a destination device via a physical port that selected in accordance with a static bandwidth allocation. When the requested media stream includes video data, the requested media stream is sent to the destination device via a least loaded physical port that is dynamically identified based on the estimated traffic loads of each of the plurality of physical ports.

18 Claims, 5 Drawing Sheets

(56) References Cited

U.S. PATENT DOCUMENTS

| | | | |
|---|---|---|---|
| 2004/0268358 | A1 | 12/2004 | Darling et al. |
| 2004/0268375 | A1 | 12/2004 | Joy et al. |
| 2005/0232274 | A1 | 10/2005 | Kadambi et al. |
| 2006/0120282 | A1* | 6/2006 | Carlson et al. ............... 370/229 |
| 2007/0195761 | A1 | 8/2007 | Tatar et al. |
| 2008/0151890 | A1* | 6/2008 | Zelig et al. ................... 370/390 |

OTHER PUBLICATIONS

Andrew A. Poe and Quentin F. Stout, "Load Balancing 2-Phased Geometrically Based Problems," In Proceedings of 9th SIAM Conference on Parallel Processing, 1999, 10 pages.

Cyril Fonlupt, Philippe Marquet, and Jean-Luc Dekeyser, "Data-Parallel Load Balancing Strategies," Parallel Computing, 1998, pp. 1665-1684, vol. 24, No. 11.

Malwina J. Luczak and Eli Upfal, "Reducing Network Congestion and Blocking Probability Through Balanced Allocation," IEEE Symposium on Foundations of Computer Science, 1999, pp. 587-595.

Artur Czumaj, Chris Riley, and Christian Scheideler, "Perfectly Balanced Allocation," In Proceedings of the 7th International Workshop on Randomization and Approximation Techniques in Computer Science, 2003, pp. 240-251.

Artur Czumaj, "Recovery Time of Dynamic Allocation Processes," In Proceedings of the 10th Annual ACM Symposium on Parallel Algorithms and Architectures, 1998, pp. 202-211.

A. Basermann, J. Fingberg, G. Lonsdale, B. Maerten, R. Ducloux, and C. Walshaw, "Dynamic cost modelling and load balancing for mesh-based applications," Parallel Computing: Special Issue on "Graph Partitioning and Parallel Computing," 1999, 17 pages.

Olivier Bonaventure, "Short bibliography on Traffic control and QoS in IP networks," Nov. 23, 2000, 28 pages.

* cited by examiner

SYSTEM AND METHOD OF COMMUNICATING A MEDIA STREAM

CROSS-REFERENCE TO RELATED APPLICATIONS

The present application claims priority from and is a continuation of patent application Ser. No. 11/858,730, filed Sep. 20, 2007 (now U.S. Pat. No. 8,068,416 and entitled "SYSTEM AND METHOD OF COMMUNICATING A MEDIA STREAM," the content of which is expressly incorporated herein by reference in its entirety.

FIELD OF THE DISCLOSURE

The present disclosure is generally related to a system and method of allocating media streams.

BACKGROUND

Video content and other data streams can be bandwidth intensive and typically require multiple servers and network links to support a total traffic load. Load balancing among servers and links can increase overall utilization efficiency of network components and quality of service to end-users. Nonetheless, the variable nature of video content rates and other data rates can prevent accurate estimation of data traffic, requiring increased network infrastructure to provide headroom for inefficient load balancing.

For example, video streams are typically high bandwidth transmissions and real-time video streams may be affected by changes in available network bandwidth. A typical video stream MPEG-4 encoded in Standard Definition (SD) format consumes approximately 2.5 Megabits per second (Mbps) for a quality transmission. A typical MPEG-4 encoded video stream in a High Definition (HD) format consumes approximately 10.5 Mbps for a quality transmission. If the IP network allocates insufficient bandwidth to video streams, the quality of services degrades.

Conventionally, high-speed IP networks utilize link aggregation to allocate media streams. Such link aggregation allows multiple physical links of a switch/router to be combined into a logical port that provides much higher bandwidth via lower speed ports and enables distribution of network traffic across the aggregated ports to achieve load balancing. A technique for communicating link aggregation information between switches/routers is described in an industry standard (i.e., the IEEE 803.ad Standard), which describes a protocol for communicating link aggregation information. However, the IEEE 803.ad Standard does not specify an algorithm to be used to assign traffic flows within the individual links of a link aggregation group.

Traditionally, a static load-balancing algorithm is applied that assigns traffic flows based on header information carried in the IP packets. The load-balancing algorithm is typically a static mathematical algorithm. In a particular example, for IP traffic, the algorithm may assign traffic flows based on a combination of factors, including a source IP address, a destination IP address, a source port, a destination port, and a protocol identifier (ID). In an environment that has a large number of small streams with different combinations of factors, the static mathematical algorithm may provide a fairly equal distribution across the aggregated ports. Further, a transmission control protocol (TCP) is adapted to dynamically adapt to available bandwidth in case there is network congestion due to an uneven distribution of traffic loads among the link aggregation ports.

However, such traditional (static) algorithms may not work well for video applications. Such algorithms typically take into account the stream count but not the bandwidth requirements. Since some video streams have variable bit rates, such static algorithms do not account for such variations.

DETAILED DESCRIPTION

Figure 1:
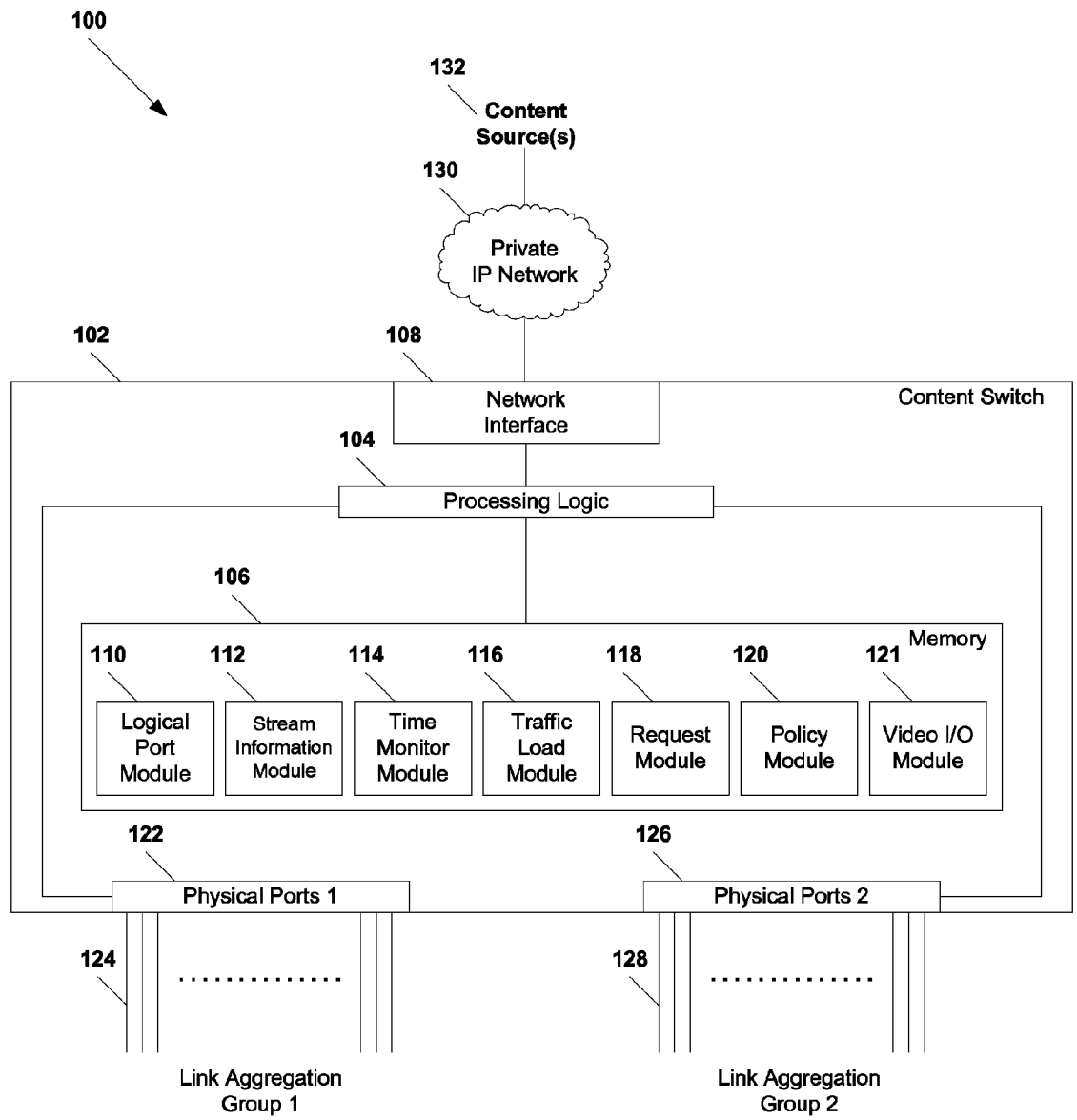
FIG. 1 is a block diagram illustrating a particular embodiment of a system to communicate a media stream.

In a particular embodiment, a method includes measuring port usage data related to each of a plurality of physical ports associated with a link aggregation group. The method also includes estimating a bandwidth requirement of a requested media stream and adding the estimated bandwidth requirement of the requested media stream to a traffic load at each of the plurality of physical ports to produce an estimated total traffic load of each of the plurality of physical ports. When the requested media stream includes non-video data, the method further includes selecting a port of the plurality of physical ports in accordance with a static bandwidth allocation and sending the requested media stream to a destination device via the selected port. When the requested media stream includes video data, the method includes dynamically identifying a least loaded physical port of the link aggregation group based on the estimated traffic loads of each of the plurality of physical ports and sending the requested media stream to the destination device via the least loaded physical port.

In another particular embodiment, a non-transitory computer-readable medium includes instructions that, when executed by a processor, cause the processor to measure port usage data related to each of a plurality of physical ports associated with a link aggregation group. The instructions are also executable to cause the processor to estimate a bandwidth requirement of a requested media stream and add the estimated bandwidth requirement of the requested media stream to a traffic load at each of the plurality of physical ports to produce an estimated total traffic load of each of the plurality of physical ports. When the requested media stream includes non-video data, the instructions are further executable to cause the processor to select a port of the plurality of physical ports in accordance with a static bandwidth allocation and to send the requested media stream to a destination device via the selected port. When the requested media stream includes video data, the instructions are also to cause the processor to dynamically identify a least loaded physical port of the link aggregation group based on the estimated traffic loads of each of the plurality of physical ports and to send the requested media stream to the destination device via the least loaded physical port.

In another particular embodiment, a system includes a link aggregation group having a plurality of physical ports, a processor, and a memory storing instructions executable by the processor to measure port usage data related to each of the plurality of physical ports associated with the link aggregation group. The instructions are also executable by the processor to estimate a bandwidth requirement of a requested media stream and to add the estimated bandwidth requirement of the requested media stream to a traffic load at each of the plurality of physical ports to produce an estimated total traffic load of each of the plurality of physical ports. When the requested media stream includes non-video data, the instructions are further executable by the processor to select a port of the plurality of physical ports in accordance with a static bandwidth allocation and to send the requested media stream to a destination device via the selected port. When the requested media stream includes video data, the instructions are executable by the processor to dynamically identify a least loaded physical port of the link aggregation group based on the estimated traffic loads of each of the plurality of physical ports and to send the requested media stream to the destination device via the least loaded physical port.

Referring to FIG. 1, a system to allocate media streams is illustrated and designated generally 100. The system 100 includes a content switch 102, such as a network content switch/router system or other edge system of an Internet Protocol Television (IPTV) network or other packet-based video distribution network. The content switch communicates with a plurality of content sources 132, which may include a plurality of video servers. In a particular embodiment, the content switch 102 can communicate with the content sources 132 via a private Internet Protocol (IP) network 130. In another embodiment, the content switch 102 can be coupled to the content sources 132 via physical links. In a particular illustrative embodiment, the content switch 102 can be a network device that is part of a private access network, a core network, or any combination thereof. Additionally, the content switch 102 may be adapted to support one or more network routing and switching protocols and one or more transport technologies.

In an illustrative embodiment, the content switch 102 can include processing logic 104, such as one or more independent or redundant processors, and can include a memory 106 that is accessible to the processing logic 104. Further, the content switch 102 can include a network interface 108 to communicate with the private IP network 130. In addition, the content switch 102 includes multiple physical ports, which may be logically grouped as illustrated by a first plurality of physical ports 122 and a second plurality of physical ports 126. Each plurality of physical ports 122,126 is associated with a link aggregation group and can be treated by the content switch 102 as a single logical port or other logical channel. In general, link aggregation refers to a grouping of multiple network links (i.e., communication channels or circuits) into one logical high bandwidth link, which may be used to route audio data, text data, video data, or any combination thereof. A link aggregation group refers to a set or group of physical ports, such as the first plurality of physical ports 122, which are logically grouped to form a single logical port to provide the high-bandwidth link.

For example, the first plurality of physical ports 122 can be associated with a first link aggregation group 124 and can be treated by the content switch 102 as a first logical port. Similarly, the second plurality of physical ports 126 can be associated with a second link aggregation group 128 and can be treated by the content switch 102 as a second logical port.

The memory 106 includes a plurality of modules 110-121 that each provide one or more functions of the content switch 102 with respect to allocating media streams. In an illustrative embodiment, the modules 110-121 can represent instructions that are executable by the processing logic 104, such as instructions embodied in one or more software programs stored at the memory 106. In another embodiment, the modules 110-121 can represent hardware, software instructions, or any combination thereof.

For example, the memory 106 can include a logical port module 110 that stores data identifying link aggregation groups, including data associating the physical ports with a logical port. Further, the memory 106 can include a stream information module 112 that stores data indicating bandwidth consumption, bit rates, or other indications of traffic load, which are associated with various media streams accessible to the content switch 102 from the content sources 132. The stream information module 112 may also store data indicating a media type associated with each media stream. Such media streams can include Voice over Internet Protocol (VoIP) data, audio data, text data, images, video streams, or any combination thereof.

In a particular embodiment, the memory 106 can include a time monitor module 114 that is executable by the processing logic 104 to monitor a time clock for each of a plurality of time measurement points. The memory 106 can include traffic load module 116 that is executable by the processing logic 104 to measure a traffic load at each of the physical ports 122, 126 of the content switch 102. In another embodiment, the traffic load module 116 can be executable by the processing logic 104 to measure traffic loads at each of the first plurality of physical ports 122 after a first time interval and to measure traffic loads at each of the second plurality of physical ports 126 after a second time interval. The traffic load module 116 is also executable by the processing logic 104 to store data related to each multicast join request and each multicast leave request received at the content switch 102 between each pair of time measurement points. Data related to join and leave requests can include a video stream joined or left, a join or leave time, a bit rate associated with the video stream, an identification of a port affected by the request (e.g., a port over which a joined video stream is sent or a port over which a left video stream is no longer sent), or any combination thereof. In an illustrative embodiment, the traffic load module 116 can filter out join requests corresponding to multicast streams already being sent via the link aggregation group (e.g., the link aggregation group 124) through which the join request is received.

In a particular embodiment, the memory 106 includes a request module 118 that is executable by the processing logic 104 to receive a request for a media stream, such as an Internet Group Management Protocol (IGMP) join request, from a set-top box device, or other destination device of the media distribution network. For example, the set-top box device (not shown) may communicate with the content switch 102 via at least one of the first plurality of physical ports 124. The content switch 102 can be adapted to receive the request directly from the destination device via one of the links (e.g., one of the links of the link aggregation group 124) coupled to the content switch 102. Alternatively, the request can originate from the destination device and the content switch 102 can be adapted to receive the request from a digital subscriber line access multiplexer (DSLAM), central office (CO), other edge system, or other entity of the media distribution network.

In response to the request, the request module 118 can be executable by the processing logic 104 to determine a current real-time traffic load corresponding to each physical port associated with the link aggregation group through which the request was received. For example, if the request is received via a link associated with the first link aggregation group (Link Aggregation Group 1) 124, the request module 118 can be executable by the processing logic 104 to determine a current traffic load at each of the first plurality of physical ports 122. In an illustrative embodiment, the request module 118 can be executable by the processing logic 104 to retrieve a traffic load measured for each of the first plurality of ports 122 at a most recent time measurement point from the traffic load module 116. Further, the request module 118 can be executable by the processing logic 104 to retrieve from the traffic load module 116 data related to each join request and each leave request affecting data streams sent via the first plurality of physical ports 122 since the most recent time measurement point.

The request module 118 can be executable by the processing logic 104 to determine the current real-time traffic load at each of the first plurality of physical ports 122 by adjusting the most recent measured traffic load for each port to reflect each join request and each leave request affecting video streams sent via the port since the most recent time measurement point. For instance, where the measured traffic load at each physical port includes a particular bit rate, the particular bit rate can be increased by a bit rate associated with each join message affecting streams sent via the port since the most recent time measurement point and can be decreased by a bit rate associated with each leave message received affecting streams sent via the port since the most recent time measurement point.

In a particular illustrative embodiment, the request module 118 may be adapted to determine a media type associated with a request. For example, the request module 118 may receive a first request related to a Voice over Internet Protocol (VoIP) call, a second request related to retrieval of text data, and a third request that is related to a video stream. The request module 118 may be adapted to select a physical port from the first plurality of physical ports 122 using a first technique when the request relates to a VoIP call, text data or other non-video data and using a second technique when the request relates to video data. In general, in a triple-play (Voice, Internet, and video data) environment, conventional techniques may be used to route Voice and Internet traffic (i.e., non-video data) and the video routing techniques described below with respect to FIGS. 2-4 may be used to route multimedia data, such as video data.

In a particular embodiment, the memory 106 can include a policy module 120 that stores data indicating threshold video traffic loads. The policy module 120 can be executable by the processing logic 104 to compare the video data traffic load at each of the first plurality of physical ports 122 with a pre-defined threshold. If video traffic loads at all of the first plurality of physical ports 122 exceed the pre-defined threshold, policy module 120 can be executable by the processing logic 104 to reject the request for the video stream. The policy module 120 can also be executed by the processing logic 104 to calculate statistics related to the traffic load data. In a particular illustrative embodiment, the policy module 120 may compare statistics to various statistical thresholds. For example, such statistics may include an average traffic load over a period of time, a ratio of streams to traffic load, other statistics, or any combination thereof.

If video traffic loads at one or more of the first plurality of physical ports 122 are lower than the pre-defined threshold, the request module 118 can be executable by the processing logic 104 to identify a port having the lowest video traffic load. The request module 118 can be executable by the processing logic 104 to determine whether a total video traffic load, including the current video traffic load and a traffic load associated with the requested video stream, would exceed the threshold. If not, the video input/output module 121 can be executable by the processing logic 104 to send the requested video stream via the port having the lowest video traffic load. Otherwise, the request module 118 can be executable by the processing logic 104 to reject the request for the video stream.

In an illustrative, non-limiting embodiment, the request module 118 can determine, before rejecting the request, whether an existing stream can be dropped at one of the first plurality of physical ports 122, such that the video traffic load at the port does not exceed the threshold after the new video stream is added at the port. If no stream can be dropped at any of the ports such that the threshold can be satisfied, the request module 118 can be executable by the processing logic 104 to reject the request for the video stream. Otherwise, the video input/output module 121 can be executable by the processing logic 104 to discontinue the existing video stream and to assign the requested video stream via the port at which the existing stream has been dropped.

In a particular embodiment, the content switch 102 can be adapted to perform various actions when a video traffic load is equal to a pre-defined threshold (rather than being over or under the threshold). For example, a request can be rejected if each port of a plurality of physical ports associated with a link aggregation group is equal to or exceeds a threshold. Conversely, the port having the lowest video traffic load can be identified if video traffic loads at one or more of the ports are equal to or lower than the threshold. In another example, a video stream can be sent via a port having the lowest video traffic load if a total video traffic load at the port is or would be equal to the threshold. Alternatively, a request can be rejected if the total video traffic load at the port is or would be equal to the threshold.

For ease of explanation, FIG. 1 has been described with reference to video streams. Nonetheless, streams requested from the content switch 102 can include Voice-over Internet Protocol (VoIP) data, Internet data, or other data offered via a triple-play network, which may provide voice services, Internet services, and television services, for example.

Figure 2:
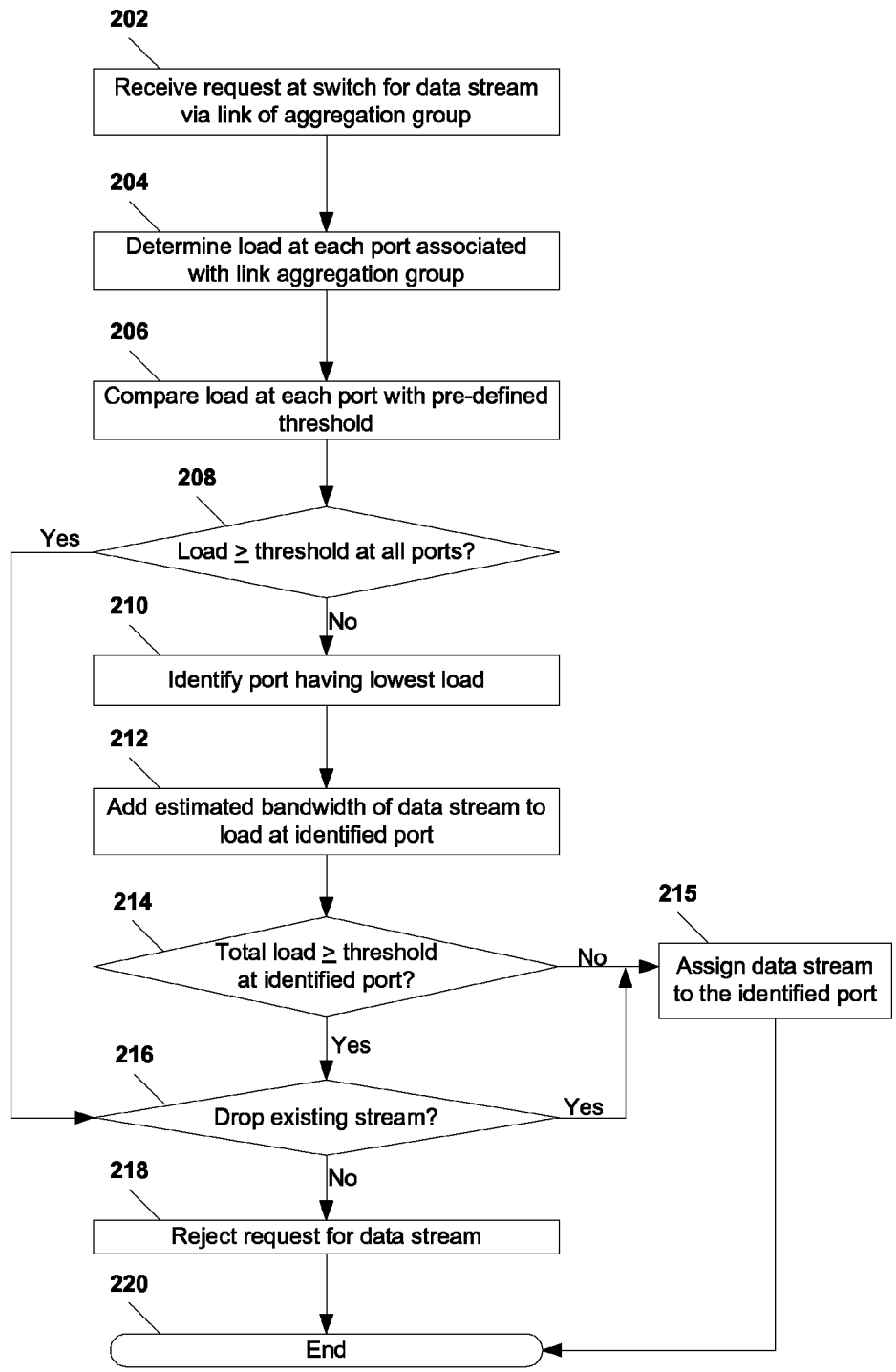
FIG. 2 is a flow diagram illustrating a particular embodiment of a method of communicating media stream.

Referring to FIG. 2, a particular embodiment of a method of communicating a media stream is illustrated. At block 202, a switch/router system of a network, such as a multilayer content switch of a triple-play network, receives a request for a new data stream via a link of a link aggregation group. The request can include, for example, an Internet Group Management Protocol (IGMP) join request or other multicast join request related to a video stream. Alternatively, the request can include a unicast request. In other embodiments, the request can relate to Voice-over Internet Protocol (VoIP) streams or Internet data streams. The request can be received from a destination device or a network entity of the video distribution network.

Moving to block 204, the switch/router system determines a traffic load at each physical port associated with the link aggregation group through which the request was received. The traffic loads determined by the switch/router system can be current real-time traffic loads that include a traffic load measured for each port at a most recent time measurement point, adjusted to reflect each join request and each leave request received at the switch/router system since the most recent time measurement point, which affects data sent via the port. For instance, where the measured video traffic load at each physical port includes a particular bit rate, the particular bit rate can be increased by a bit rate associated with each join message affecting data sent via the port since the most recent time measurement point and can be decreased by a bit rate associated with each leave message affecting data sent via the port since the most recent time measurement point.

Proceeding to block 206, the switch/router system compares the traffic load at each port with a pre-defined threshold stored at the switch/router system. Continuing to decision node 208, the switch/router system determines whether the traffic loads at all of the ports associated with the link aggregation group meet or exceed the pre-defined threshold. If the traffic loads at all of the ports associated with the link aggregation group meet or exceed the pre-defined threshold, the method advances to decision node 216. On the other hand, if one or more of the ports associated with the link aggregation group is lower than the pre-defined threshold, the method advances to block 210.

At block 210, the switch/router system identifies a port associated with the link aggregation group having a lowest load (i.e., identifies a port having the most available bandwidth to accept a new stream). Moving to block 212, the switch/router system adds an estimated bandwidth associated with the requested data stream to the load at the identified port, thereby producing a total traffic load. Continuing to decision node 214, the switch/router system determines whether the total traffic load meets or exceeds the pre-defined threshold. If the total traffic load is lower than the pre-defined threshold, the method moves to block 215, and the data stream is assigned to the identified port. Whereas, if the total traffic load meets or exceeds the pre-defined threshold, the method proceeds to decision node 216.

Proceeding to decision node 216, the switch/router system determines whether an existing data stream can be dropped at any of the ports associated with the link aggregation group, such that a total traffic load at the port at which the existing data stream is dropped is lower than the pre-defined threshold. If such a data stream can be dropped, the method proceeds to block 215, and the requested video stream can be assigned to the port at which the existing data stream is dropped. Conversely, if such a data stream cannot be dropped, the method moves to block 218, and the request is rejected by the switch/router system. The method terminates at 220.

Figure 3:
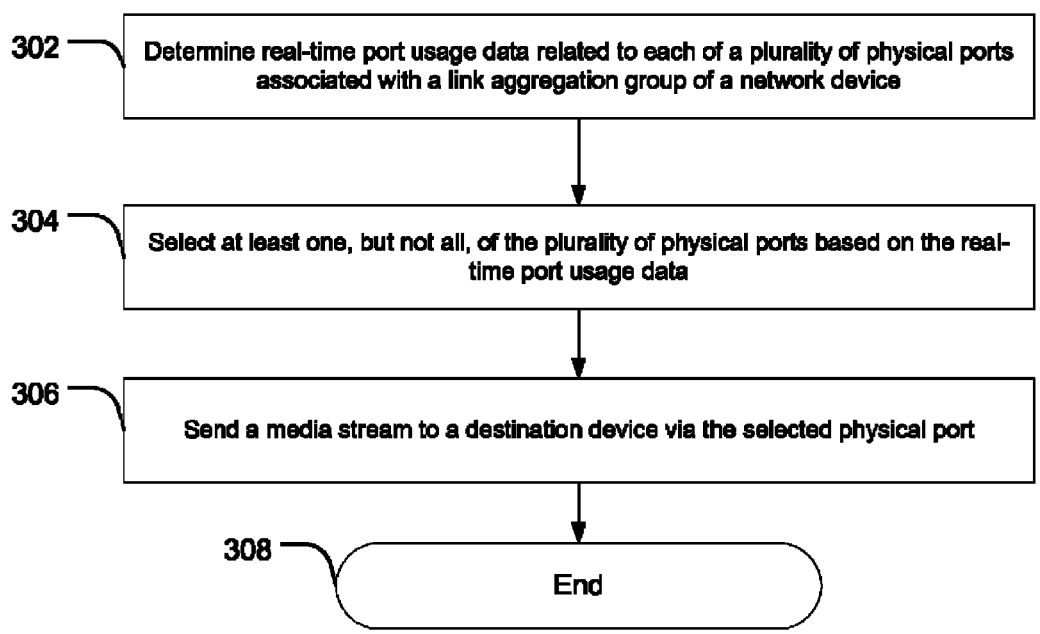
FIG. 3 is a flow diagram illustrating a second particular embodiment of a method of communicating a media stream.

Referring to FIG. 3, a second particular embodiment of a method of communicating a media stream is illustrated. At 302, a network device, such as a content switch of a core network or an access network, determines real-time port usage data related to each of a plurality of physical ports associated with a link aggregation group. In a particular illustrative embodiment, each physical port may transmit audio, video, text, other data, or any combination thereof, to a destination device, such as a set-top box device, a Voice over Internet Protocol (VoIP) enabled device, a portable computing device, another device, or any combination thereof. The real-time port usage data may be determined from real-time or near real-time bandwidth measurements, from an estimated data load associated with each port, from statistical analysis of the types of data streams, from other data, or any combination thereof.

Moving to 304, the network device selects at least one, but not all, of the plurality of physical ports based on the real-time usage data. In a particular illustrative, non-limiting embodiment, the selected physical port may be a least-loaded physical port relative to other ports of the link aggregation group. In a particular illustrative embodiment, the network device may determine a media type associated with the new media stream and select the physical port from the link aggregation group according to a fixed bandwidth allocation when the media type includes a Voice of Internet Protocol (VoIP) stream or data according to a dynamic bandwidth allocation when the media type includes video data.

In another particular illustrative embodiment, the network device may also determine whether a quality of service associated with media streams already assigned to the physical port would be affected by selecting the physical port and make an admission control decision with respect to the new media stream based on the determination. In another illustrative embodiment, selecting the physical port can include estimating a bandwidth estimation per media stream and selecting the physical port based on the real-time port usage data and the bandwidth estimation. In a particular illustrative embodiment, the bandwidth estimation can be an optimal estimate. In still another particular, selecting the physical port can include determining an average bit rate over a time interval for each media stream on each port associated with the link aggregation group and selecting the physical port according to the average bit rate determined in the time interval.

In a particular illustrative embodiment, the new media stream can include a guaranteed bandwidth requirement. The network device may be adapted to compare the guaranteed bandwidth requirement to an available bandwidth associated with the physical port to determine whether a quality of service would be affected. The network device may make an admission control decision that includes routing the new media stream to a different physical port based on the determination.

Proceeding to 306, a media stream is communicated to a destination device via the physical port. In a particular example, the media stream may be assigned to the selected physical port with which the destination device is associated. The destination device may be a network router or switch, a set-top box device, a computer, a mobile phone, another device, or any combination thereof. The media stream can be a unicast media stream or a multicast media stream. The method terminates at 308.

Figure 4:
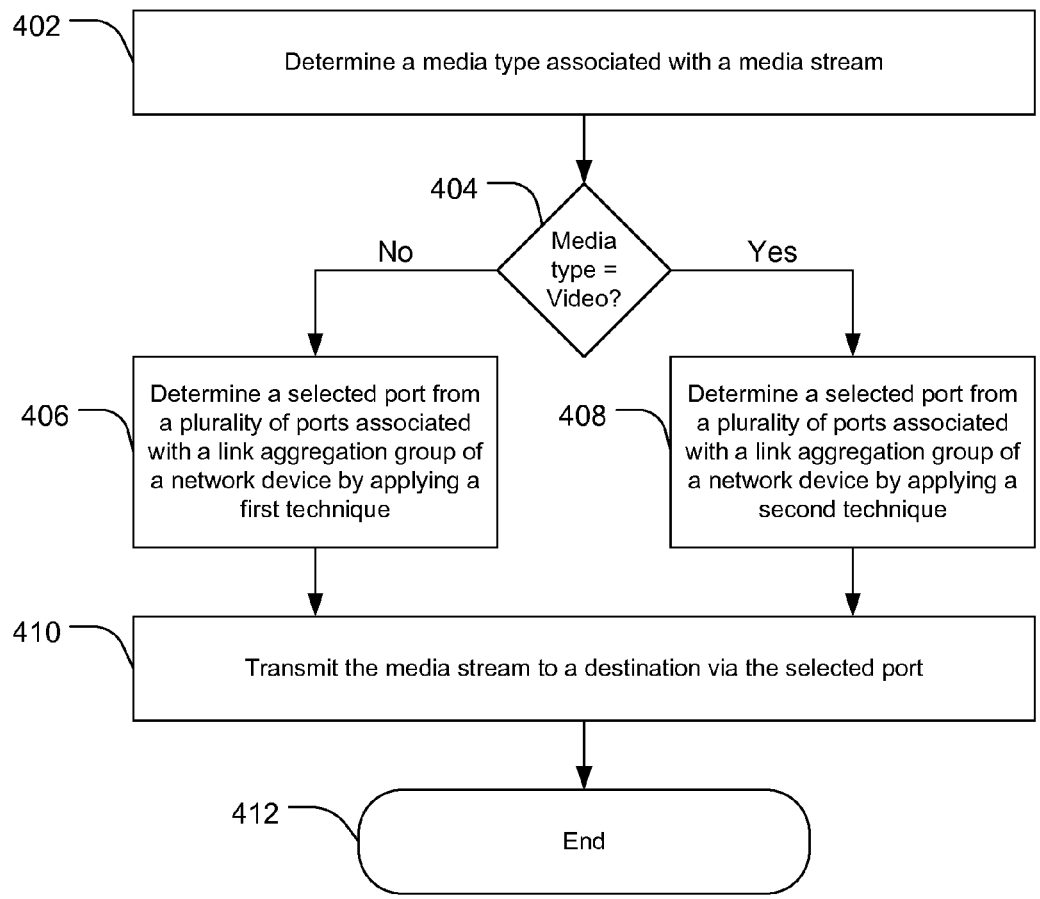
FIG. 4 is a flow diagram illustrating a third particular embodiment of a method of communicating a media stream.

Referring to FIG. 4, a third particular embodiment of a method of communicating a media stream is illustrated. At 402, a network device determines a media type associated with a media stream. The media type can include a video stream, a data stream, an audio stream such as a Voice over Internet Protocol (VoIP) stream, another media type, or any combination thereof.

Moving to decision node 404, the network device determines whether the media type is video. If the media type is not video, the method advances to 406 and the network device determines a selected port from a plurality of ports associated with a link aggregation group of the network device by applying a first technique. In a particular illustrative embodiment, the first technique may be a static routing algorithm. In another particular illustrative embodiment, the first technique may utilize header information carried in IP packets or Ethernet frames to select the physical port. In yet another particular illustrative embodiment, the first technique may select the physical port based on a stream count associated with the port. Conversely, if the media type is video, the method advances to 408 and the network device determines a selected port from a plurality of ports associated with the link aggregation group of the network device by applying a second technique. The second technique may be a dynamic stream allocation technique that takes into account real-time (or near real-time) actual usage data, quality of service requirements, and actual port loading information to dynamically allocate media streams. In a particular instance, the selected port may have a lowest real-time port usage relative to other ports of the plurality of ports.

Advancing to 410, the network device transmits the media stream to a destination via the selected port. In a particular example, the network device can assign the media stream to the selected port. The destination can include a computer, a mobile phone, a set-top box device, another network device, another device, or any combination thereof. In a particular illustrative embodiment, the new media stream may be a multicast stream, and the network device can estimate a bandwidth consumption for a multicast group associated with the multicast stream based on a mask. The mask may be a label or other indicator that can be used to define the multicast group. The mask may also specify particular properties, such as bandwidth consumption property, for each address associated with the mask. For example, the mask may define a particular multicast group, and the network device may assign the same bandwidth consumption for each address of the multicast group based on the mask. The method terminates at 412.

In a particular illustrative embodiment, the network device may route the data based on the media type using the first technique or the second technique, where the first technique is a static port allocation algorithm and where the second technique is a dynamic bandwidth allocation technique. In a particular embodiment, the network device may measure a real-time port usage for each port of a plurality of ports associated with a link aggregation group. The real-time port usage can include an aggregate bandwidth. The network device can transmit a new media stream via a selected port from the plurality of ports based on the real-time port usage and add an estimated bandwidth associated with the new media stream to the real-time port usage for the selected port. In a particular illustrative embodiment, the network device may be adapted to reject the new media stream when the real-time port usage exceeds a usage threshold.

The methods described herein have been presented for ease of explanation. In alternative embodiments, various aspects of the methods can be performed in particular sequences not described herein, or simultaneously, without departing from this disclosure.

In conjunction with the configuration of structure described herein, the systems and methods described herein include a network device to allocate media streams among a plurality of physical ports that are associated with a link aggregation group. The network device may be adapted to utilize real-time (or near real-time) usage data to identify a least-loaded physical port and to assign a new media stream to the least loaded physical port based on one or more policies. In a particular illustrative embodiment, the network device may be adapted to select the physical port using a first algorithm when the media type associated with the new media stream indicates a non-video media type and using a second algorithm when the media type is a video media type. The systems and methods described herein may be utilized to route unicast and/or multicast data in a triple-play environment. Such data can include audio data (i.e., voice data), images, video data, text data, other information, or any combination thereof, to support telephony services, Internet services, and television services.

Figure 5:
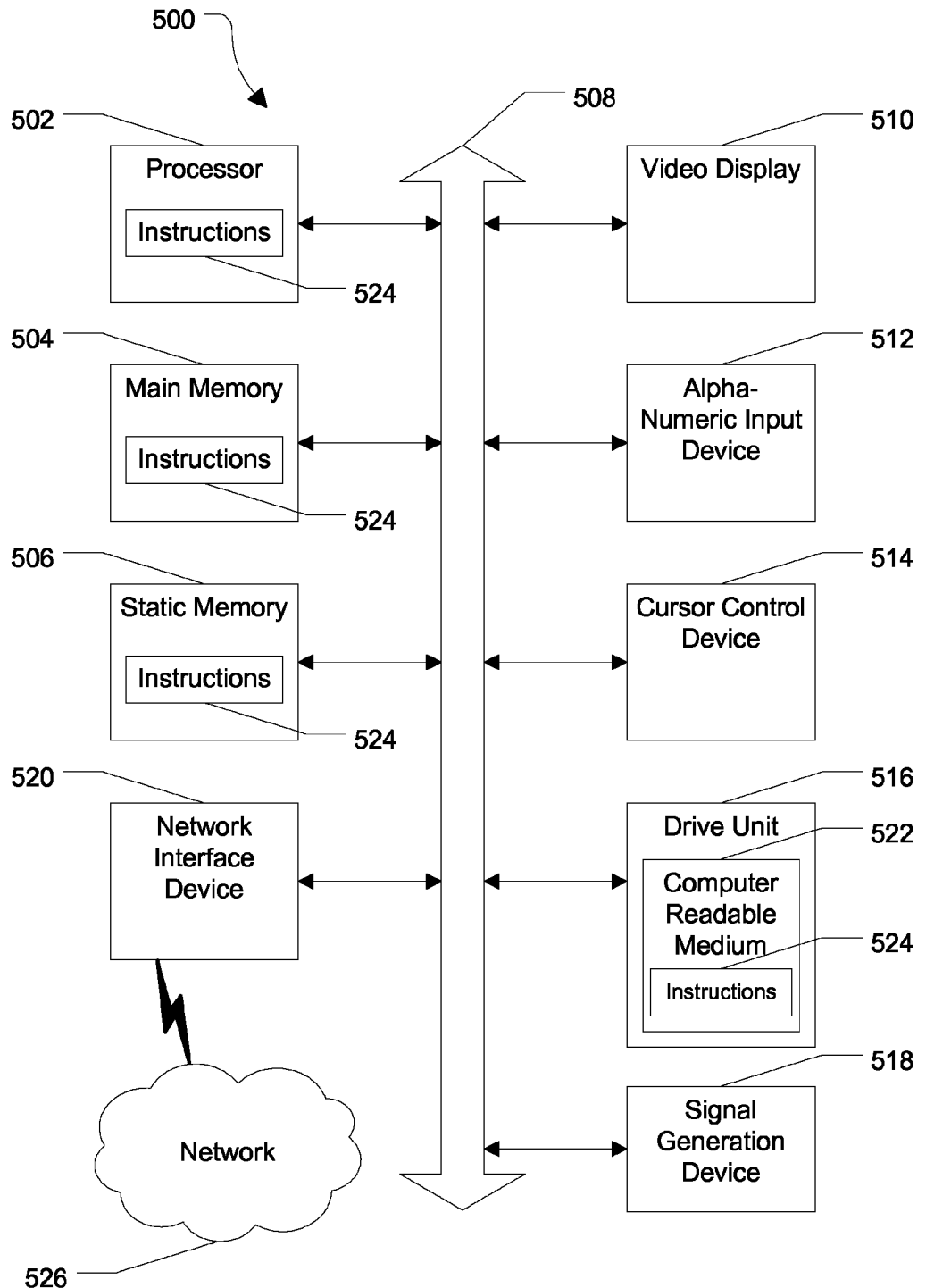
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices, such as a video server, content switch, switch/router system, or network device, as described with reference to FIGS. 1-4.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, which can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   measuring port usage data related to each of a plurality of physical ports associated with a link aggregation group;
   estimating a bandwidth requirement of a requested media stream;
   when the requested media stream comprises non-video data:
      selecting a port of the plurality of physical ports in accordance with a static bandwidth allocation; and
      sending the requested media stream to a destination device via the selected port; and
   when the requested media stream comprises video data:
      identifying a least loaded physical port of the link aggregation group;
      determining whether an estimated total traffic load of the least loaded physical port exceeds a threshold, wherein the estimated total traffic load of the least loaded physical port is a sum of the estimated bandwidth requirement of the requested media stream and a traffic load of the least loaded physical port;
      in response to a determination that the estimated total traffic load of the least loaded physical port does not exceed the threshold, sending the requested media stream to the destination device via the least loaded physical port; and
      in response to a determination that the estimated total traffic load of the least loaded physical port exceeds the threshold:
         dropping an existing media stream at the least loaded physical port and sending the requested media stream to the destination device via the least loaded physical port; or
         rejecting transmission of the requested media stream.

2. The method of claim 1, wherein the selected port has an estimated traffic load that is less than or equal to a maximum traffic load.

3. The method of claim 1, wherein the non-video data comprises Internet data, audio data, or voice over internet protocol data.

4. The method of claim 1, further comprising:
in response to a determination that the estimated total traffic load of the least loaded physical port exceeds the threshold, determining whether an existing media stream at the least loaded physical port is to be dropped;
wherein the requested media stream is sent to the destination device via the least loaded physical port in response to a determination that the existing media stream is to be dropped; and
wherein transmission of the requested media stream is rejected in response to a determination that the existing media stream is not to be dropped.

5. The method of claim 1, wherein each of the plurality of physical ports is associated with a single logical port.

6. The method of claim 1, further comprising determining whether a quality of service associated with other media streams would be affected by the requested media stream.

7. The method of claim 1, further comprising determining an estimated total traffic load of the link aggregation group based on an average bit rate of each media stream assigned to each of the plurality of physical ports.

8. The method of claim 1, further comprising dropping an existing media stream from the least loaded physical port prior to sending the requested media stream to the destination device via the least loaded physical port.

9. The method of claim 1, further comprising receiving an interne group management protocol join request for the requested media stream.

10. The method of claim 9, further comprising monitoring connections to each of the plurality of physical ports.

11. The method of claim 10, further comprising increasing a bit rate usage associated with join messages to establish the connections to each of the plurality of physical ports.

12. The method of claim 10, further comprising decreasing a bit rate usage associated with leave messages to drop the connection to a particular physical port of the plurality of physical ports.

13. The method of claim 1, further comprising monitoring bandwidth consumption associated with each of a plurality of media streams.

14. A computer-readable storage device comprising instructions that, when executed by a processor, cause the processor to perform operations comprising:
measuring port usage data related to each of a plurality of physical ports associated with a link aggregation group;
estimating a bandwidth requirement of a requested media stream;
when the requested media stream comprises non-video data:
selecting a port of the plurality of physical ports in accordance with a static bandwidth allocation; and
sending the requested media stream to a destination device via the selected port; and
when the requested media stream comprises video data:
identifying a least loaded physical port of the link aggregation group;
determining whether an estimated total traffic load of the least loaded physical port exceeds a threshold, wherein the estimated total traffic load is a sum of the estimated bandwidth requirement of the requested media stream and a traffic load of the least loaded physical port;
in response to a determination that the estimated total traffic load of the least loaded physical port does not exceed the threshold, sending the requested media stream to the destination device via the least loaded physical port; and
in response to a determination that the estimated total traffic load of the least loaded physical port exceeds the threshold:
dropping an existing media stream at the least loaded physical port and sending the requested media stream to the destination device via the least loaded physical port; or
rejecting transmission of the requested media stream.

15. The computer-readable storage device of claim 14, wherein the port usage data is measured in real-time.

16. The computer-readable storage device of claim 14, wherein the operations further comprise:
in response to a determination that the estimated total traffic load of the least loaded physical port exceeds the threshold, existing media stream at the least loaded physical port is to be dropped;
wherein the requested media stream is sent to the destination device via the least loaded physical port in response to a determination that the existing media stream is to be dropped; and
wherein transmission of the requested media stream is rejected in response to a determination that the existing media stream is not to be dropped.

17. A system comprising:
a link aggregating group comprising a plurality of physical ports;
a processor; and
a memory storing instructions executable by the processor to:
measure port usage data related to each of the plurality of physical ports associated with the link aggregation group;
estimate a bandwidth requirement of a requested media stream;
when the requested media stream comprises non-video data:
select a port of the plurality of physical ports in accordance with a static bandwidth allocation; and
send the requested media stream to a destination device via the selected port; and
when the requested media stream comprises video data:
identify a least loaded physical port of the link aggregation group based;
determine whether an estimated total traffic load of the least loaded physical port exceeds a threshold, wherein the estimated total traffic load is a sum of the estimated bandwidth requirement of the requested media stream and a traffic load of the least loaded physical port;
in response to a determination that the estimated total traffic load of the least loaded physical port does not exceed the threshold, send the requested media stream to the destination device via the least loaded physical port; and
in response to a determination that the estimated total traffic load of the least loaded physical port exceeds the threshold:
drop an existing media stream at the least loaded physical port and send the requested media stream to the destination device via the least loaded physical port; or
reject transmission of the requested media stream.

18. The system of claim 17, wherein the memory stores instructions further executable by the processor to:
in response to a determination that the estimated total traffic load of the least loaded physical port exceeds the threshold, determine whether an existing media stream at the least loaded physical port is to be dropped;

wherein the requested media stream is sent to the destination device via the least loaded physical port in response to a determination that the existing media stream is to be dropped; and wherein transmission of the requested media stream is rejected in response to a determination that the existing media stream is not to be dropped.

* * * * *